US007929163B2

(12) United States Patent
Park et al.

(10) Patent No.: US 7,929,163 B2
(45) **Date of Patent: *Apr. 19, 2011**

(54) WIRELESS COMMUNICATION APPARATUS AND METHOD IN AN IMAGE FORMING SYSTEM

(75) Inventors: Sang-Cheol Park, Suwon-si (KR); Young-Min Kim, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 1663 days.

This patent is subject to a terminal disclaimer.

(21) Appl. No.: 11/192,191

(22) Filed: Jul. 29, 2005

(65) Prior Publication Data

US 2006/0029399 A1 Feb. 9, 2006

(30) Foreign Application Priority Data

Aug. 9, 2004 (KR) ........................ 10-2004-0062629

(51) Int. Cl.
*G06F 3/12* (2006.01)

(52) U.S. Cl. ...... 358/1.15; 358/1.14; 358/1.9; 358/1.16; 399/12; 399/24; 340/572.1; 340/572.2

(58) Field of Classification Search .......... 358/1.1–1.15; 399/313, 24, 12, 319; 340/572.1, 572.2
See application file for complete search history.

(56) References Cited

U.S. PATENT DOCUMENTS

| | | | | |
|---|---|---|---|---|
| 5,446,447 | A * | 8/1995 | Carney et al. | 340/572.4 |
| 6,249,227 | B1 * | 6/2001 | Brady et al. | 340/572.5 |
| 6,312,106 | B1 * | 11/2001 | Walker | 347/50 |
| 6,346,884 | B1 * | 2/2002 | Uozumi et al. | 340/572.1 |
| 6,354,493 | B1 * | 3/2002 | Mon | 235/380 |
| 6,839,035 | B1 * | 1/2005 | Addonisio et al. | 343/742 |
| 7,043,166 | B2 * | 5/2006 | Parry et al. | 399/12 |
| 7,088,246 | B2 * | 8/2006 | Fukuoka | 340/572.5 |
| 7,230,730 | B2 * | 6/2007 | Owen et al. | 358/1.14 |
| 7,382,990 | B2 * | 6/2008 | Park et al. | 399/24 |
| 7,446,646 | B2 * | 11/2008 | Huomo | 340/10.1 |
| 2002/0171703 | A1 * | 11/2002 | Phillips et al. | 347/19 |
| 2002/0191998 | A1 * | 12/2002 | Cremon et al. | 400/76 |
| 2003/0043949 | A1 * | 3/2003 | O'Toole et al. | 375/374 |
| 2004/0082309 | A1 * | 4/2004 | Smith | 455/344 |

FOREIGN PATENT DOCUMENTS

| | | |
|---|---|---|
| JP | 09-263022 | 10/1997 |
| JP | 2000-003115 | 1/2000 |
| JP | 2001-096814 | 4/2001 |
| JP | 2003-216450 | 7/2003 |
| KR | 2001-0106667 | 12/2001 |

* cited by examiner

*Primary Examiner* — Twyler L Haskins
*Assistant Examiner* — Dennis Dicker
(74) *Attorney, Agent, or Firm* — Roylance, Abrams, Berdo & Goodman, L.L.P.

(57) ABSTRACT

A wireless communication apparatus and method in an image-forming system employ RFID tags capable of transmitting/receiving data via wireless communication. The RFID tags are mounted, respectively, on bottoms of fixing and developing units of the image-forming system, or on bottoms of feed and Organic Photosensitive Conductor (OPC) units of the image-forming system in case if the image-forming system has a detachable developing unit structure. An RFID reader is provided as an integral component of the motherboard or mounted as a separate module thereon. Priorities for wireless communication are assigned to the RFID tags mounted on the units and, according to the priorities, the RFID reader performs wireless communication with the RFID tags to read and write data from/into the RFID tags.

20 Claims, 5 Drawing Sheets

WIRELESS COMMUNICATION APPARATUS AND METHOD IN AN IMAGE FORMING SYSTEM

CLAIM OF PRIORITY

This application claims the benefit under 35 U.S.C. §119 (a) of an application entitled "WIRELESS COMMUNICATION APPARATUS AND METHOD IN AN IMAGE FORMING SYSTEM" filed in the Korean Intellectual Property Office on Aug. 9, 2004 and assigned Serial No. 2004-62629, the entire contents of which are hereby incorporated by reference.

BACKGROUND OF THE INVENTION

1. Field of the Invention

The present invention relates to a wireless communication apparatus and method in an image-forming system. More particularly, the present invention provides a plurality of Radio Frequency Identification (RFID) tags mounted on a plurality of units of the image-forming system, respectively, and an RFID reader mounted on a motherboard of the image-forming system that can read and write data from/into the RFID tags via wireless communication.

2. Description of the Related Art

Electrophotography is widely used in image-forming systems such as a copy machine, a Laser Beam Printer (LBP) and a laser fax. As well known in the art, electrophotography comprises process steps of electrification, exposure, development, transfer and fixing.

FIG. 1 schematically illustrates an engine mechanism of an image-forming system based upon a general electrophotography, in which contact electrification is utilized.

The contact electrification shown in FIG. 1 is adapted to minimize ozone generation induced from electrification, in which a conductive roll or brush used as a contact electrifier is contacted with a photosensitive drum to form a predetermined level of surface potential. In particular, FIG. 1 illustrates a contact electrification using a conductive roll.

As shown in FIG. 1, a photosensitive drum 10 is rotated in the direction of an arrow by an engine-driving motor (not shown), which is a main motor of an engine unit, in response to respective process steps of the electrophotography.

First, in an electrification step, the photosensitive drum 10 as a photosensitive body is electrified by an electrification roll 12 so that the photosensitive drum 10 can be uniformly charged. In this case, the electrification roll 12 is applied with negative potential under the negative charge voltage $V_{CH}$.

The photosensitive roll 10 is electrified through its contact with the electrification roll 12 to have a negative surface potential, which is typically about −800V. Feed rolls 30 and 32 transport a sheet of printing paper 42 fed from a manual feed slot (not shown) toward a developing unit. Upstream of the feed rolls 30 and 32, there is mounted a manual feed sensor 40 for detecting the insertion of the printing sheet 42 into the manual feed slot. Downstream of the feed rolls 30 and 32, there is mounted a feed sensor 41 for detecting whether the sheet inserted through the manual feed slot is properly fed toward the developing unit.

In a second step of exposure, the electrified photosensitive drum 10 is exposed corresponding to a manuscript or an image data to form an electrostatic latent image on the photosensitive drum. The electrostatic latent image is formed on the photosensitive drum by exposing only a portion of the photosensitive drum 10 corresponding to an image area to be printed with a Laser Scanning Unit (LSU) 14. That is, the exposed portion of the drum 10 changes its surface potential while the remaining portion of the drum 10 maintains the surface potential, and therefore a potential difference is induced between the exposed and remaining portions to form the electrostatic latent image.

In a third step of development, developing agent is applied onto the electrostatic latent image on the photosensitive drum 10 to convert the latent image into a visible image. That is, a developing roll 16 is typically supplied with a developing bias voltage of about −450V to have a negative potential, and the developing agent is applied on the developing roll 16. A doctor blade (not shown) is provided to regulate the developing agent applied on the developing roll 16 to a constant quantity. Then, the developing agent of the negative potential is partially moved to the exposed area of the photosensitive drum 10 and applied thereon under the potential difference to complete the developing step.

In a fourth step of transfer, the developing agent applied on the photosensitive drum 10 is transferred to the printing sheet by a transfer roll 18. The transfer roll 18 is generally supplied with a transfer voltage $V_T$ of about +800 to +1500V to fix the developing agent from the photosensitive drum 10 to the printing sheet which is being fed.

Fifth, in a fixing step, the transferred printing sheet is passed through a hot roll 20 of a high temperature and a pressure roll 22 of a high pressure to fuse toner on the printing sheet. Then, the fixed printing sheet is discharged out of the image-forming system to complete a copying or printing process on a single printing sheet.

In the image-forming system, a manual feed unit is devised to print special sheets individually since those special sheets (e.g., transparent sheets for an overhead projector (OHP), envelope or label) are not easily fed by a common feed cassette. Although a multi-purpose paper feed unit may be used for continuous printing of special sheets, low price image-forming systems generally use a manual feed unit which does not require additional devices.

The manual feed printing starts with gripping a single sheet with the feed rolls 30 and 32 to a predetermined degree. Then, the feed rolls 30 and 32 are driven in response to a printing command to feed the gripped sheet along a sheet feed direction.

When the sheet is inserted into the manual feed slot in a standby status, the manual feed sensor 40 shown in FIG. 1 detects the insertion of the sheet. A motor is driven in response to the detection of the sheet insertion to move the sheet to a predetermined distance so that the feed rolls 30 and 32 can grip the leading edge of the sheet to a predetermined degree as shown in FIG. 1 and load the sheet in position. In response to a printing command, the motor is driven again to turn the feed rolls 30 and 32 from the sheet-loading position so that the sheet can be fed and printed.

In the image-forming system as above, memories are mounted on fixing and developing units, respectively, so that a central processing unit (CPU) on the motherboard can analyze the cartridge information of the fixing and developing units.

In this case, a CPU writes desired information including provider name, model name, the number of printed pages, the number of printed dots and the lamp-on time of the fixing unit (e.g., a fixing unit comprising a hot roll 20 and pressure roll 22) into the memory mounted on the fixing unit, and reads information from the memory periodically or in response to user selection to analyze the present status of the fixing unit for example in order to inform replacement time to a user.

In addition, the CPU of the motherboard can write or read desired information including provider name, model name, serial number, the number of pages printed up to the present, the number of printed dots and the quantity of waste toner (e.g., the number of rotations of an Organic Photosensitive Conductor (OPC) unit) into/from the memory mounted on the developing unit (e.g., a developing unit comprising a developing roll 16) to analyze the present status of the developing unit in order to inform replacement time to the user.

However, since the motherboard is necessarily in direct contact with the memories in order to write/read the data into/from the memories, this disadvantageously increases design limitations of the image-forming system.

SUMMARY OF THE INVENTION

It is therefore an object of the present invention to provide a wireless communication apparatus and method in an image-forming system, in which a plurality of RFID tags are mounted on a plurality of units of the image-forming system, respectively, and an RFID reader is mounted on a motherboard of the image-forming system to read and write data from/into the RFID tags via wireless communication.

According to an aspect of the present invention, there is provided a wireless communication apparatus in an image-forming system, comprising: a plurality of first communication units installed in a plurality of parts of the image-forming system, respectively, each of the first communication units being capable of performing wireless data communication as well as storing and managing data; and a second communication unit mounted on a motherboard of the image-forming system for transmitting and receiving data to/from the first communication units via wireless communication.

Preferably, each of the first communication units comprises a Radio Frequency Identification (RFID) tag. The first communication units are detachably mounted on a bottom of a fixing and integral developing unit of the image-forming system, respectively, as well as on an input side of a detachable developing unit and a bottom of an Organic Photosensitive Conductor (OPC) unit, respectively.

Preferably, the first communication units are adapted to maintain a distance of approximately 1 to 20 cm from the second communication unit.

Preferably, the second communication unit comprises an RFID reader which is integrated into the motherboard to form an entire circuit in a single PCB, wherein the second communication unit is adapted to assign priority among the first communication units and to execute wireless communication with the first communication units according to the priority.

According to another aspect of the present invention, there is provided a plurality of RFID tags mounted on fixing and developing units of the image-forming system, respectively, each of the RFID tags being capable of performing wireless data communication as well as storing and managing data; and an RFID reader mounted on a motherboard of the image-forming system to wirelessly transmit and receive the data to/from the plurality of RFID tags.

Preferably, the RFID tag mounted on the fixing unit stores and manages information which comprises at least one selected from the group consisting of provider name, model name, the number of printed pages, the number of printed dots and the lamp-on time of the fixing unit. The RFID tag mounted on the developing unit stores and manages information which comprises at least one selected from the group consisting of provider name, model name, serial number, the number of pages printed up to the present, the number of printed dots and the quantity of waste toner (the number of rotation of an OPC unit).

According to another aspect of the invention for realizing the object, there is provided a wireless communication apparatus in an image-forming system which has a detachable developing structure, comprising: a plurality of RFID tags mounted on feed and Organic Photosensitive Conductor (OPC) units of the image-forming system, respectively, each of the RFID tags being capable of performing wireless data communication as well as storing and managing data; and an RFID reader mounted on a motherboard of the image-forming system to transmit and receive the data to/from the plurality of RFID tags via wireless communication.

Preferably, the RFID tag mounted on the feed unit stores and manages information which comprises at least one selected from the group consisting of provider name, model name, serial number, the number of pages printed up to the present, the number of printed dots and the quantity of waste toner (e.g., the number of rotations of the OPC unit), wherein the RFID tag mounted on the developing unit stores and manages information which comprises at least one selected from the group consisting of provider name, model name, serial number, the number of pages printed up to the present, the number of printed dots and the quantity of waste toner (the number of rotation of the OPC unit).

According to yet another aspect of the invention for realizing the object, there is provided a wireless communication method in an image-forming system including a plurality of units and a motherboard, the method comprising the steps of:

setting priority for wireless communication to a plurality of RIFD tags mounted on the plurality of units; and operating an RFID reader mounted on the motherboard to perform wire communication comprising reading or writing data from or into the RFID tags sequentially according to the priority.

Prior to the description of preferred embodiments of the present invention, the "RFID" technology implemented via the present invention will first be discussed.

RFID (i.e., the short form of Radio Frequency Identification) refers to an advanced technology of automatic identification via radio frequency, which is regarded as a representative one of contactless cards or other devices that will replace bar code and magnetic card systems.

An RFID system is constituted of three components: a reader, a host computer and a tag or transponder.

While an antenna of the reader radiates a radio wave, the tag containing ID and data is activated in a magnetic field to transmit the ID and data to the antenna.

The antenna converts the ID from the tag into a data signal and transmits the data signal to a computer, which in turn compares the data signal with a previously stored database to provide a desired service.

The RFID system is a next generation core technology capable of removing drawbacks of the conventional bar code and magnetic identification systems, and its application range is increasing significantly due to its convenience in use, improvement in productivity, change in user recognition and advancement in culture and technology.

A low frequency band of approximately 125 kHz to 400 kHz is generally used for short distance transmission generally in RFID applications. At present, a readers' transmission frequency is typically used in a carrier frequency band of approximately 125 kHz to 2.4 GHz.

The available frequency of the RFID has been widening into radio frequencies of 4 to 20 MHz and a microwave frequency of 2.45 GHz, and the frequency band of 13.56 MHz is becoming the standard frequency of the RFID.

The RFID tags are classified into two types, that is, active and passive types generally according to whether a battery is installed or not.

Active tags have batteries installed therein, and passive tags are provided with energy in the range of a radio wave from a reader.

An active tag is internally mounted with a battery so that it transmits RF signals according to a preset time period while the battery powers the tag. Although the active tag can perform data communication with a remote reader, the use of the active tag is limited since it is expensive and can be operated only in a limited time period according to the lifetime of the battery.

A passive tag is constituted of an antenna coil and a chip. When the tag is placed within an electromagnetic field created by a reader, an AC voltage is applied to the antenna coil of the tag, and the tag rectifies the AC voltage into a DC voltage to use it as electric power for the chip. When a predetermined voltage is applied to the chip of the tag, the tag is activated and transmits data to the reader. This process is generally referred to as backscattering.

Most tags have short read ranges of approximately 2 to 70 cm that are determined according to an antenna circuit and its size. Since theses tags can be fabricated at a low price, the tags are widely used in logistics, fabrication, transportation and management of domestic animals.

The RFID reader supplies RF energy to the passive tag to activate it while reading information from the tag. In order to achieve this function, the reader comprises a section for transmitting and receiving RF signals, as well as decoding the signals. In addition, the reader communicates with the host computer via serial communication (e.g., RS-232), USB and Ethernet.

The RF transmission section comprises an antenna circuit, a tuning circuit and an RF carrier generator. The antenna tuning circuit and the antenna are designed to provide suitable tuning for optimum performance.

A micro-controller decodes a received signal to obtain data. A firmware algorithm in the micro-controller transmits RF signals, analyzes received data, and communicates with the host computer.

In general, the reader has a read-only function. A reader that is capable of performing read/write functions is also referred to as interrogator. The interrogator uses a command-containing pulse to perform functions for reading/writing data during communication with the tag.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
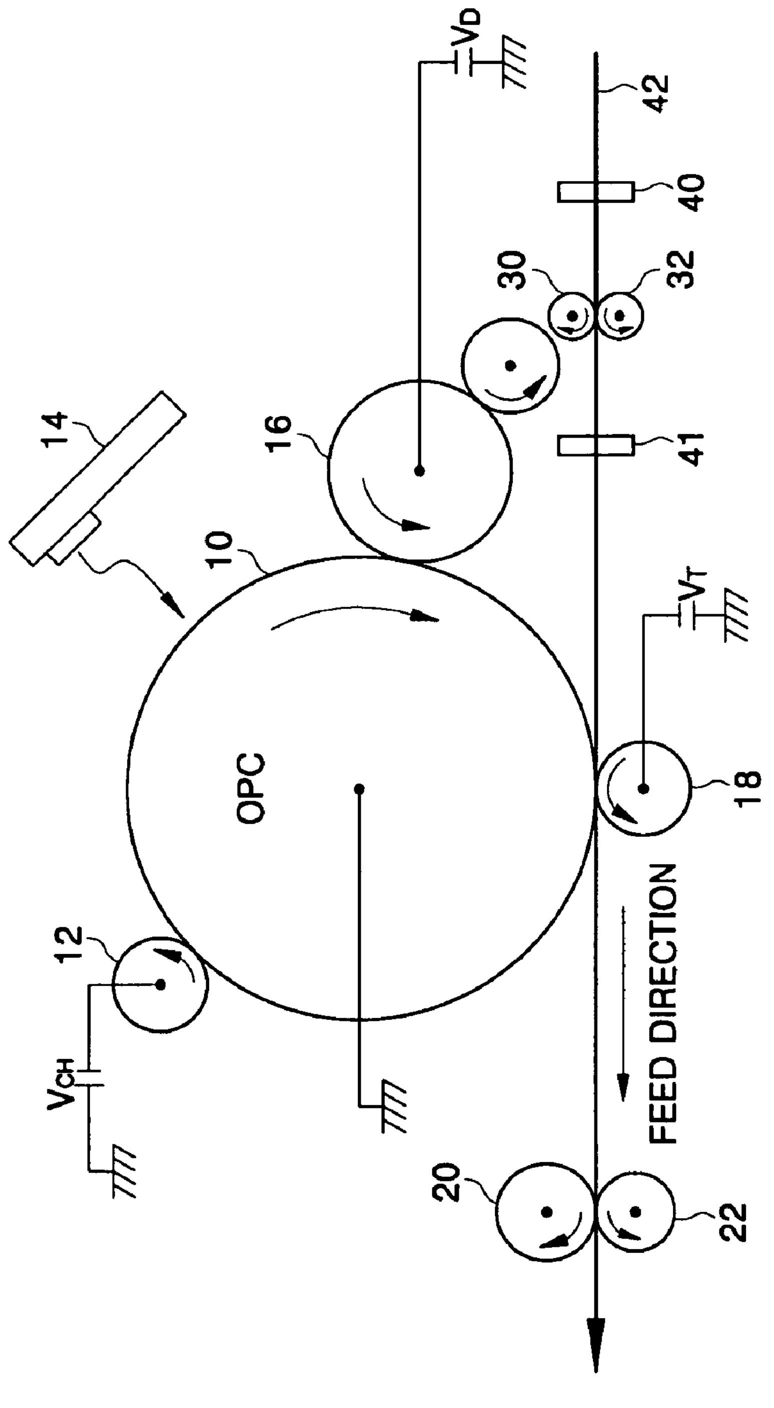
FIG. 1 (PRIOR ART)
FIG. 1 illustrates an engine mechanism of a conventional image-forming system.

Hereinafter preferred embodiments of wireless communication apparatus and method in an image-forming system of the present invention will be described in detail with reference to the accompanying drawings. Herein components related with the present invention that are similar to those in FIG. 1 will be omitted for conciseness FIG. 2 illustrates the structure of an image-forming system according to a first embodiment of the invention, which incorporates RFIDs mounted on a fixing unit and a developing unit, respectively.

Figure 2:
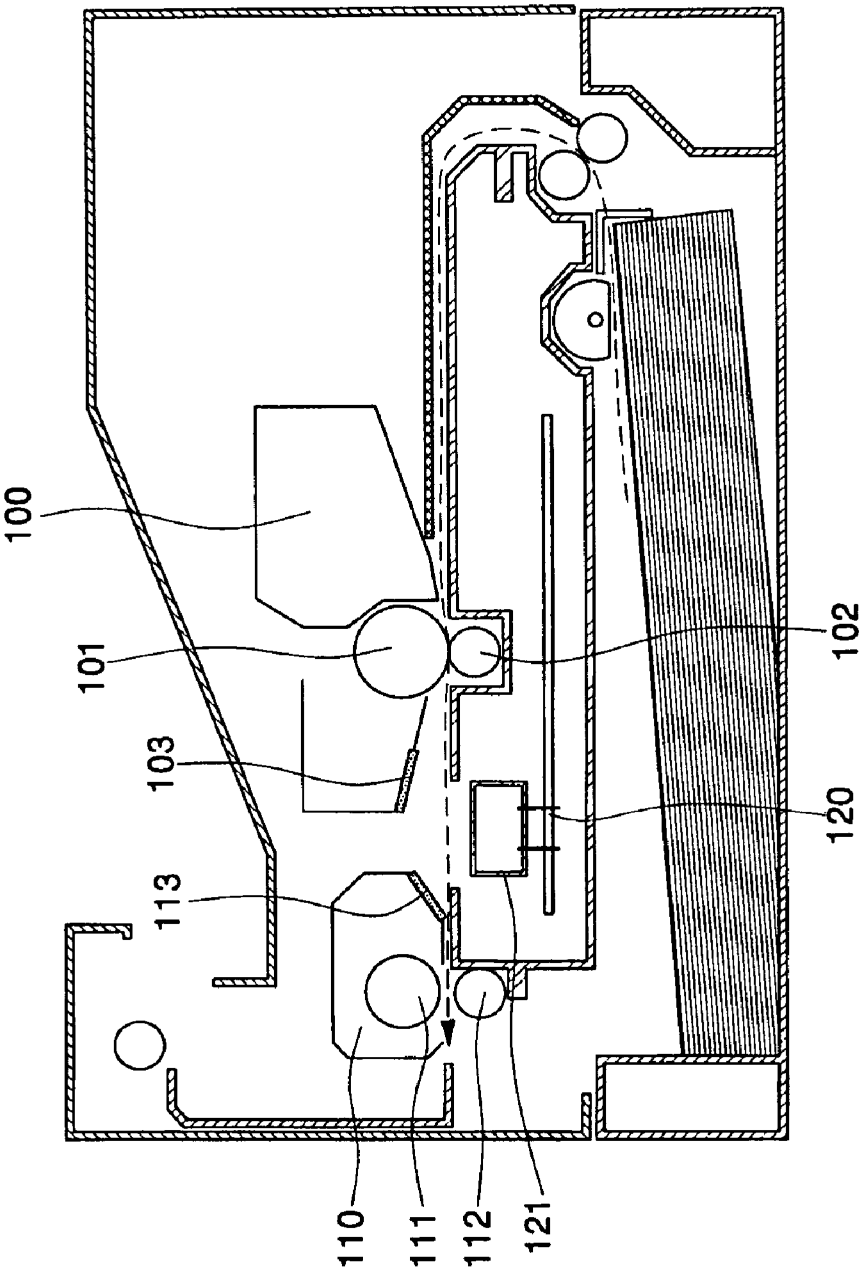
FIG. 2 illustrates an image-forming system according to a first embodiment of the invention, which incorporates RFIDs mounted on a fixing unit and a developing unit, respectively.

As shown in FIG. 2, the image-forming system of the invention comprises RFID tags 113 and 103 mounted on bottoms of a fixing unit 110 and a developing unit 100, respectively, and a reader 121 mounted on a motherboard 120 of the image-forming system. The reader 121 performs wireless communication with the RFID tags 103 and 113 while maintaining predetermined distances therefrom in order to read and write data from/into the RFID tags 103 and 113. The RFID tag 103 is mounted on a lower position of the developing unit 100, and the RFID tag 113 is mounted on a further lower position of the fixing unit 110. In this way, the RFID tags 103 and 113 are mounted on positions where the RFID tags 103 and 113 can perform wireless communication with the RFID reader 121 mounted on the motherboard 120 so that the RFID reader 121 can read/write data from/into the RFID tags 103 and 113.

The RFID reader 121 is not restricted in its structure so that it may be an integral component of the motherboard 120, or optionally a separate module mounted on the motherboard 120. At any case, the RFID reader 121 is mounted on the motherboard 120 maintaining predetermined distances from the RFID tags 103 and 113 mounted on the bottoms of the fixing and developing units 110 and 100, respectively, so that it can properly perform wireless communication with the RFID tags 103 and 113.

Herein, the RFID tags 103 and 113 may be spaced from the RFID reader 121 on the motherboard 120 by approximately 1 to 50 cm, and preferably, by approximately 1 to 20 cm from mechanical structures even though wireless communication may be performed more stably in shorter distances.

In addition, the motherboard 120 is generally provided in the form of a chassis made of metal. In this case, a portion of the motherboard 120 mounted with the RFID reader 121 is made of plastic to enable wireless communication. In other words, radio signals are not shielded around a plastic region of the motherboard where a wireless transmitting/receiving antenna of the RFID reader 121 is located.

As not shown in FIG. 2, each of the RFID tags 103 and 113 mounted on each of the developing and fixing units 100 and 110 typically comprises a memory for storing data, and a transceiver for transmitting the data from the memory to the reader 121 on the motherboard as well as receiving and storing data from the reader 121 into the memory. The transceiver further comprises an antenna. The memory may utilize a nonvolatile memory.

In this case, the data stored in the memory of the RFID tag 103 on the developing unit 100 may comprise at least one selected from the group consisting of provider name, model name, serial number, the number of pages printed up to the present, the number of printed dots and the quantity of waste toner (i.e., the number of rotations of an Organic Photosensitive Conductor (OPC) unit). Also, the data stored in the memory of the RFID tag 113 on the fixing unit 110 may comprise at least one selected from the group consisting of provider name, model name, the number of printed pages, the number of printed dots and the lamp-on time of the fixing unit.

In the meantime, the RFID reader 121 mounted on the motherboard 120 comprises a transceiver for transmitting and receiving data to/from the RFID tags 103 and 113 mounted respectively on the fixing and developing units 100 and 110, and a controller for processing the data transmitted/received by the transceiver, in which the transceiver comprises an antenna.

Hereinafter, the communication process of the wireless communication apparatus in the image-forming system according to a first embodiment of the present invention will be described.

First, since both of the RFID tags 103 and 113 are in positions where they can perform wireless communication with the RFID reader 121, it is not desirable for both of the RFID tags 103 and 113 to perform wireless communication simultaneously with the RFID reader 121.

Accordingly, the RFID tags 103 and 113 are designated with their own priorities so that they do not interfere with each other while performing communication with the RFID reader 121.

For example, where the RFID tag 103 mounted on the developing unit 100 is designated with priority "1" and the RFID tag 113 mounted on the fixing unit 110 is designated with priority "2", the RFID reader 121 primarily performs communication with the RFID tag 103 on the developing unit 100 due to its higher priority, and then with the RIFD tag 113 on the fixing unit 110 of the next priority.

Such priority information is stored in the memories of the RFID tags 103 and 113 mounted on the units 100 and 110, respectively.

Heretofore it has been described about an operational process in which the RFID tags 103 and 113 perform communication with the RFID reader 121 so that the RFID reader 121 reads or writes data from/into the memories in the RFID tags 103 and 113. However, some applications only need to read data stored in the RFID tags 103 and 113.

In this case, some RFID tags may be mounted with a Read Only Memory (ROM) in place of the read/writable memories of the RFID tags 103 and 113. That is, while some RFID tags require functions for reading and writing data for the preparation of various situations (e.g., RFID tags mounted on the developing unit 100 which stores important information), other RFID tags mounted on other units can suitably perform their functions by reading data without writing the same. Accordingly, RFID tags having a read/writable function and RFID tags having a read-only function can be used in combination.

The first embodiment of the invention has been described in conjunction with the RFID tags 103 and 113 attached to the fixing and developing units 100 and 110 of the image-forming system having the integral developing unit 110. The following discussion will present a structure according to a second embodiment of the invention and an operation thereof in which an RFID tag is mounted on a detachable developing unit as shown in FIG. 3.

Figure 3:
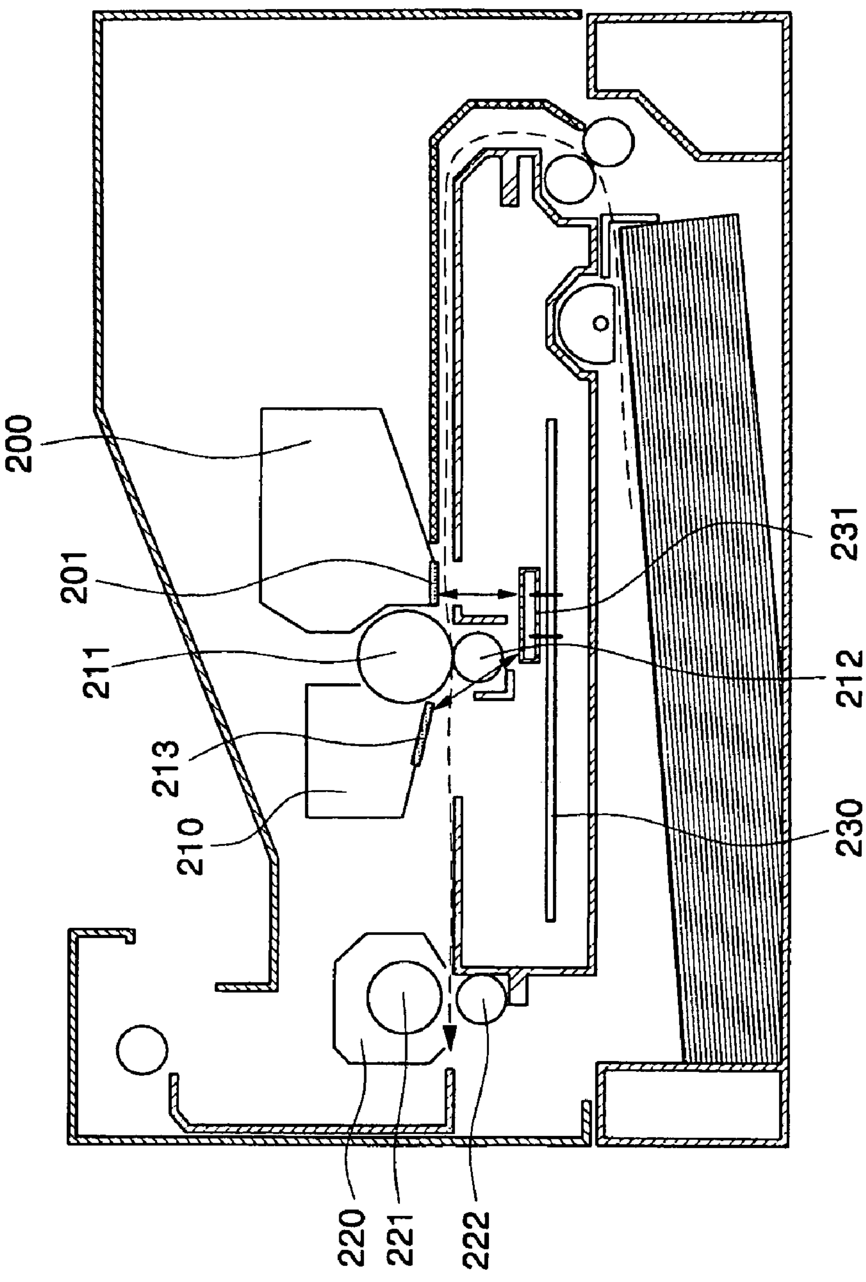
FIG. 3 illustrates an image-forming system according to a second embodiment of the invention, which incorporates RFIDs mounted on an Organic Photosensitive Conductor (OPC) unit and a feed unit, respectively.

FIG. 3 illustrates the structure of an image-forming system according to a second embodiment of the invention, which incorporates RFIDs mounted on an Organic Photosensitive Conductor (OPC) unit and a feed unit, respectively.

As shown in FIG. 3, the developing unit of the image-forming system is separated into an Organic Photosensitive Conductor (OPC) unit 210 and a feed unit 200, and RFID tags 213 and 201 are mounted on the Organic Photosensitive Conductor (OPC) unit 210 and the feed unit 200, respectively.

That is, the RFID tags 201 and 213 are mounted on bottoms of the feed unit 200 and the Organic Photosensitive Conductor (OPC) unit 210, respectively, and a reader 221 is mounted on a motherboard of the image-forming system. The reader 221 performs wireless communication with the RFID tags 201 and 213 while maintaining predetermined distances from the same. The reader 221 functions to read and write data from/into the RFID tags 201 and 213.

In this case, the data stored in the RFID tag 201 mounted on the feed unit 200 comprises at least one selected from the group consisting of provider name, model name, serial number, the number of pages printed up to the present, the number of printed dots and the quantity of waste toner (e.g., the number of rotations of an OPC unit). Also, the data stored in the RFID tag 213 mounted on the Organic Photosensitive Conductor (OPC) unit 210 comprises at least one selected from the group consisting of provider name, model name, serial number, the number of pages printed up to the present, the number of printed dots, and the quantity of waste toner (e.g., the number of rotations of an OPC unit).

The RFID reader 221 is not restricted in its structure so that it may be an integral component of the motherboard 220, or optionally a separate module mounted on the motherboard 220. In any case, the RFID reader 221 is mounted on the motherboard 220 maintaining predetermined distances from the RFID tags 203 and 213 mounted on the bottoms of the feed and Organic Photosensitive Conductor (OPC) units 200 and 210, respectively, so that it can properly perform wireless communication with the RFID tags 203 and 213.

Herein, the RFID tags 203 and 213 may be spaced from the RFID reader 221 on the motherboard 220 by approximately 1 to 20 cm as in the above-described first embodiment.

In addition, the motherboard 220 is generally provided in the form of a chassis made of metal. In this case, a portion of the motherboard 220 mounted with the RFID reader 221 is made of plastic to enable wireless communication. In other words, radio signals are not shielded around a plastic portion where a wireless transmitting/receiving antenna of the RFID reader 221 is located.

The wireless communication apparatus in the image-forming system of this embodiment has a basic operational process that is substantially the same as that of the first embodiment. The basic operation of the wireless communication apparatus in the image forming system according to the second embodiment of the invention is substantially the same as that of the first embodiment. However, this embodiment is applicable to a developing cartridge in which the Organic Photosensitive Conductor (OPC) unit 210 is separated from the feed unit 200. In this case, the Organic Photosensitive Conductor (OPC) unit 210 and the feed unit 200 have different lifetime and management information, and therefore the information of the Organic Photosensitive Conductor (OPC) unit 210 is to be managed separately from that of the feed unit 200.

As not described in the second embodiment, it is apparent to those skilled in the art that a single RFID reader can communicate with at least two RFID tags, and a plurality of units mounted with the RFID tags can be adopted with various forms in the image-forming system and other systems.

Figure 4:
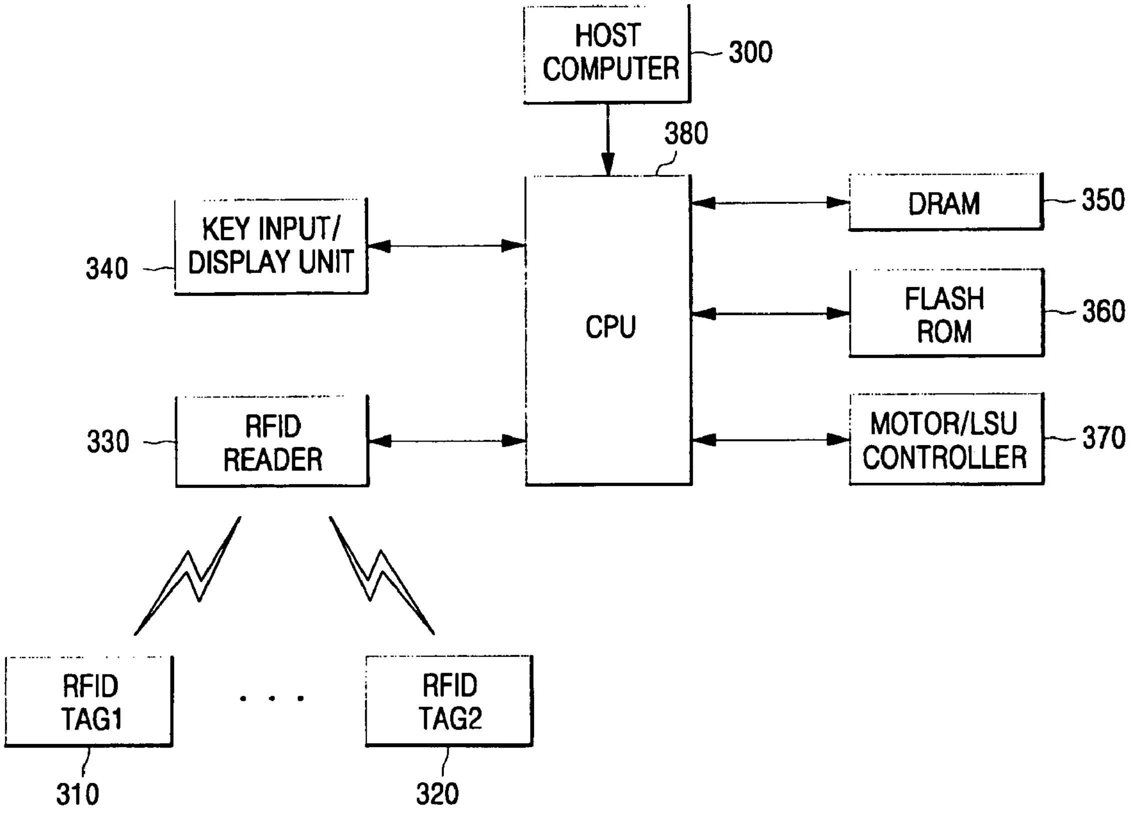
FIG. 4 is a block diagram illustrating a wireless communication apparatus adopted in image-forming systems according to the first and second embodiments of the invention as shown in FIGS. 2 and 3.

The structure and operation of the first and second embodiments of the invention will be described with reference to FIG. 4. FIG. 4 is a block diagram illustrating a wireless communication apparatus adopted in image-forming systems according to the first and second embodiments of the invention as shown in FIGS. 2 and 3, respectively.

As shown in FIG. 4, the image-forming system of the invention comprises a plurality of RFID tags 310 and 320, an RFID reader 330, a key input and display unit 340, a DRAM 350, a flash ROM 360, a motor/LSU controller 370 and a CPU 380.

The RFID tags 310 and 320 can be mounted on fixing and developing units, respectively, as shown in FIG. 2. In case of a detachable developing unit, the RFID tags 310 and 320 can be mounted on an Organic Photosensitive Conductor (OPC) unit and a feed unit, respectively, as shown in FIG. 3.

The RFID reader 330 functions to perform wireless communication with the RFID tags 310 and 320. Under the control of the CPU 380, the RFID reader 330 writes data into memories of the RFID tags 310 and 320, respectively, or reads data from memories of the RFID tags 310 and 320 to send the same to the CPU 380. Herein, the RFID reader 330 may be an integral component of a motherboard of the image-forming system, or a separate module mounted on the motherboard.

The key input/display unit 340 displays the present status of the image-forming system or the status information of functions corresponding to user requests. Also, the key input/display unit 340 sends a key input signal for the operation of the image-forming system to the CPU 380.

The DRAM 350 serves to temporarily store image data from a host computer 300 so that the image data scanned by a scanner of the image-forming system is stored by bands. In addition, in case that the image-forming system functions as a facsimile, the DRAM 350 also functions to temporarily store received facsimile data.

The flash ROM 360 stores programs for the operation of the image-forming system.

The motor/LSU controller 370 performs all functions related with image creation. For example, the motor/LSU controller 370 reads the image data from the DRAM 350 to form an image under the control of the CPU 380.

The CPU 380 controls the overall operation of the image-forming system. More particularly, the CPU 380 controls the display unit 340 to display information corresponding to data read by the RFID reader from the RFID tags 310 and 320, or sends data to the RFID reader 330 to write the same into the RFID tags 310 and 320.

The operation of the wireless communication apparatus in the image-forming system of the invention having this structure will now be described.

As shown in FIG. 4, the RFID reader 330 reads data stored in a memory of the RFID tag 310 or 320 mounted on the developing or fixing unit.

Then, the RFID reader 330 inspects an RFID tag ID from the data to analyze whether a corresponding RFID tag has an ID identical with a preset ID.

The RFID reader 330 then examines the priority of the RFID tag 310 or 320 corresponding to the data and, if the corresponding RFID tag 310 or 320 has a higher priority, performs wireless communication with the corresponding RFID tag 310 or 320.

In addition, if there is any data to be written into the corresponding RFID tag 310 or 320, the RFID reader 330 transmits the data to the RFID tag 310 or 320 via wireless communication to store the data into the memory of the RFID tag 310 or 320 under the control of the CPU 380 or any controller existing in the RFID reader 330.

Figure 5:
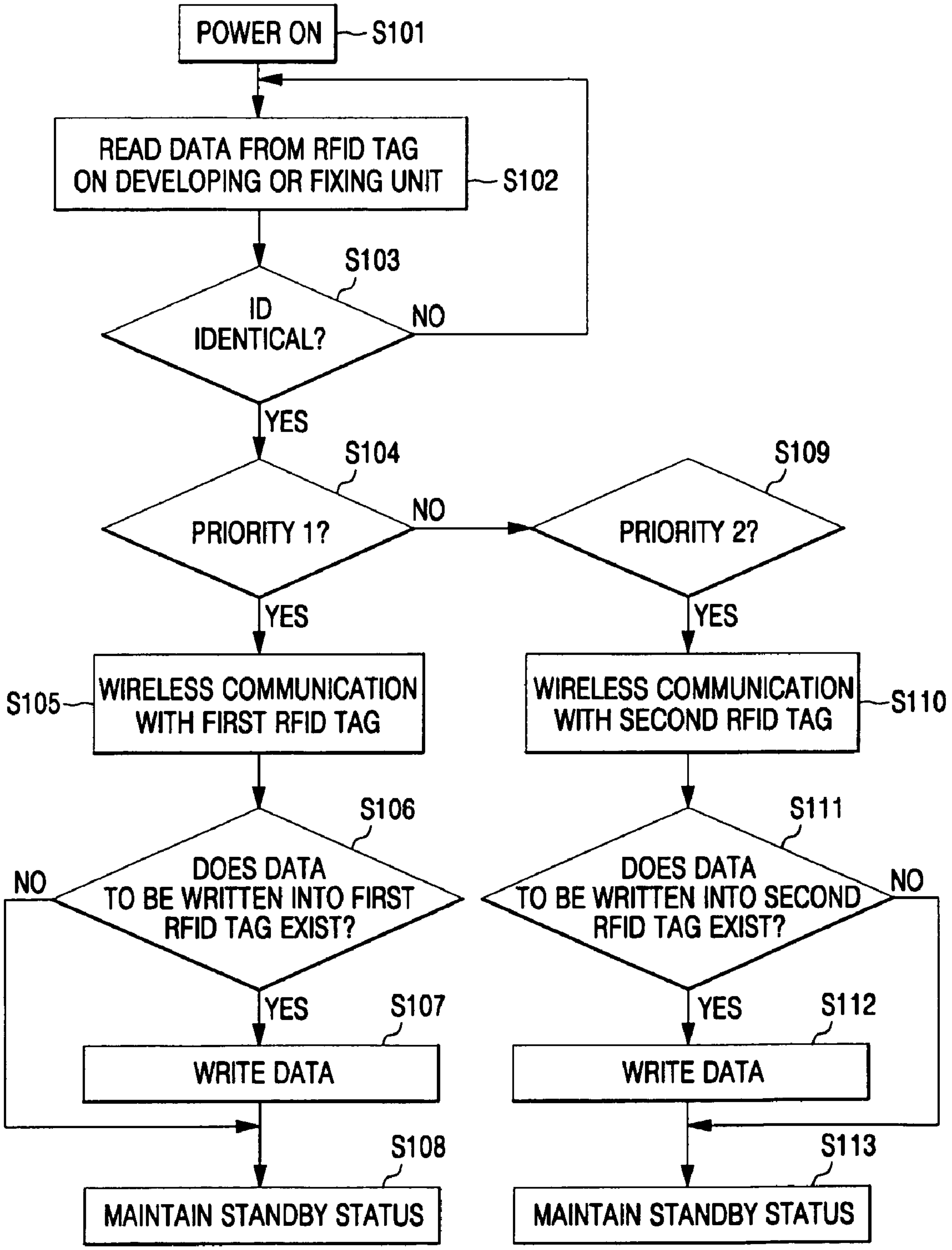
FIG. 5 is a flow chart illustrating wireless communication using an RFID tag of an image-forming system of the present invention.

A wireless communication method in the image-forming system of the invention corresponding to this operation will now be described with reference to FIG. 5. FIG. 5 is a process flowchart illustrating a wireless communication method using an RFID tag of the image-forming system of the invention.

As shown in FIG. 5, the image-forming system is first powered on in STEP S101. In STEP S102, an RFID reader mounted on a motherboard of the image-forming system wirelessly reads data stored in memories of a plurality of RFID tags mounted on fixing and developing units, respectively. If the image-forming system has a detachable developing structure, the RFID reader wirelessly reads data stored in memories of the RFID tags mounted on feed and Organic Photosensitive Conductor (OPC) units, respectively.

The RFID reader analyzes a unique ID of a corresponding RFID tag from the data to determine whether or not the RFID tag ID is identical with a preset ID in STEP S103. If the RFID tag ID is not, the process continues by continuing to read data from RFID tags mounted on fixing and developing units as in STEP S102.

If the RFID tag ID is identical with the preset ID, the RFID reader inspects whether the priority of the RFID tag is set to "1" or not in STEP S104.

If the priority of the RFID tag is "1", the RFID reader performs wireless communication with the first RFID tag in STEP S105, and examines whether any data to be written into the first RFID tag exists or not in STEP S106.

If the data to be written into the first RFID tag exists, the RFID reader writes the data into the first RFID tag in STEP S107. Upon completion of writing the data, the first RFID tag and the RFID reader maintain standby status in STEP S108.

In the meantime, if the priority of the corresponding RFID tag is not "1" in STEP S104, the RFID reader judges whether the priority set to the corresponding RFID tag is "2" or not in STEP S109.

If the corresponding RFID tag has the priority 2, the RFID reader performs wireless communication with the second RFID tag of the priority 2 in STEP S110.

During the wireless communication with the second RFID tag, the RFID reader determines whether any data to be written into the second RFID tag exists or not in STEP S111. If the data to be written exists, the RFID reader wirelessly writes the data into the second RFID tag in STEP S112, and then maintain standby status in STEP S113 along with the second RFID tag.

According to the wireless communication apparatus and method in the image-forming system of the invention as set forth above, the RFID tags capable of transmitting/receiving data via wireless communication are mounted, respectively, on the bottoms of the fixing and developing units of the image-forming system, or on the bottoms of the feed and Organic Photosensitive Conductor (OPC) units of the image-forming system when the image-forming system has a detachable developing unit structure. The RFID reader is provided as an integral component of the motherboard, or mounted as a separate module thereon. Priorities for wireless communication are assigned to the RFID tags mounted on the units and, according to the priorities, the RFID reader performs wireless communication with the RFID tags to read and write data from/into the RFID tags.

Also in the wireless communication apparatus and method in the image-forming system of the invention as set forth above, wireless communication means (e.g., a RFID reader) is integrated into the motherboard of the image-forming system to omit additional connector cables, thereby significantly saving material cost. In addition, the wireless communication means can be easily assembled to the motherboard.

In addition, this structure also can remove noises generated from the connector cables connected with the wireless communication means mounted on the motherboard of the image-forming system, thereby ensuring stability to the operation of the system. Since the entire circuit for wireless communication can be formed on the motherboard of the image-forming system, board integration can facilitate assembling process while saving material cost.

Furthermore, since wireless communication priorities are set to the respective RFID tags, a single reader can perform wireless communication with the plurality of RFID tags to save material cost.

What is claimed is:

1. A wireless communication apparatus in an image-forming system, comprising:

a plurality of first communication units installed in a plurality of parts of the image-forming system, respectively, each of the first communication units being capable of performing wireless data communication as well as storing and managing data; and a second communication unit mounted on a motherboard of the image-forming system for transmitting data to and receiving data from the first communication units via wireless communication, and where the first communication units are adapted to maintain a distance of approximately 1 to 20 cm from the second communication unit, the second communication unit being adapted to assign priority to the first communication units and execute wireless communication with the first communication units according to the priority.

2. The wireless communication apparatus according to claim 1, wherein each of the first communication units comprises a Radio Frequency Identification (RFID) tag.

3. The wireless communication apparatus according to claim 1, wherein the first communication units are detachably mounted on a fixing and integral developing unit of the image-forming system, respectively.

4. The wireless communication apparatus according to claim 1, wherein the first communication units are detachably mounted on an input side of a detachable developing unit and an Organic Photosensitive Conductor (OPC) unit, respectively.

5. The wireless communication apparatus according to claim 1, wherein the second communication unit comprises an RFID reader which is integrated into the motherboard to form an entire circuit in a single printed circuit board (PCB).

6. A wireless communication apparatus in an image-forming system, comprising:

a Radio Frequency ID (RFID) tag mounted on a bottom side of a fixing unit and a RFID tag mounted on a bottom side of a developing unit of the image-forming system, each of the RFID tags being capable of performing wireless data communication as well as storing and managing data with respect to the fixing unit and developing unit; and an RFID reader mounted on a motherboard of the image-forming system to wirelessly to transmit the data to and receive the data from the RFID tags, wherein the RFID reader is integrated into the motherboard to form an entire circuit in a single printed circuit board or PCB and is mounted below the fixing unit and the developing unit, the RFID reader being adapted to assign priority to the RFID tags and execute wireless communication with the RFID tags according to the priority.

7. The wireless communication apparatus according to claim 6, wherein the RFID tags are adapted to maintain a distance of approximately 1 to 20 cm from the RFID reader.

8. The wireless communication apparatus according to claim 6, wherein the RFID tag mounted on the fixing unit stores and manages information which comprises at least one selected from the group consisting of provider name, model name, the number of printed pages, the number of printed dots and the lamp-on time of the fixing unit.

9. The wireless communication apparatus according to claim 6, wherein the RFID tag mounted on the developing unit stores and manages information which comprises at least one selected from the group consisting of provider name, model name, serial number, the number of pages printed up to the present, the number of printed dots, and the quantity of waste toner comprising the number of rotations of an Organic Photosensitive Conductor (OPC) unit.

10. A wireless communication apparatus in an image-forming system which has a detachable developing structure, comprising:

a plurality of Radio Frequency Identification (RFID) tags mounted on feed and Organic Photosensitive Conductor (OPC) units of the image-forming system, respectively, each of the RFID tags being capable of performing wireless data communication as well as storing and managing data; and an RFID reader mounted on a motherboard of the image-forming system to transmit the data to and receive the data from the plurality of RFID tags via wireless communication, wherein the RFID reader is integrated into the motherboard to form an entire circuit in a single printed circuit board (PCB), the RFID reader is adapted to assign priority to the RFID tags and execute wireless communication with the RFID tags according to the priority.

11. The wireless communication apparatus according to claim 10, wherein the RFID tags are adapted to maintain a distance of approximately 1 to 20 cm from the RFID reader.

12. The wireless communication apparatus according to claim 10, wherein the RFID tag mounted on the feed unit stores and manages information which comprises at least one selected from the group consisting of provider name, model name, serial number, the number of pages printed up to the present, the number of printed dots, and the quantity of waste toner comprising the number of rotations of the OPC unit.

13. The wireless communication apparatus according to claim 10, wherein the RFID tag mounted on the developing unit stores and manages information which comprises at least one selected from the group consisting of provider name, model name, serial number, the number of pages printed up to the present, the number of printed dots, and the quantity of waste toner comprising the number of rotations of the OPC unit.

14. A wireless communication method in an image-forming system including a plurality of units and a motherboard, the method comprising:

(a) setting priority for wireless communication to a plurality of RFID tags mounted on the plurality of units; and (b) performing a wireless communication step of reading or writing data from or into the RFID tags sequentially according to the priority by an RFID reader mounted on the motherboard, and where the RFID tags are adapted to maintain a distance of approximately 1 to 20 cm from a second communication unit.

15. The wireless communication method according to claim 14, wherein the RFID tags are detachably mounted on a fixing unit and an integral developing unit of the image-forming system, respectively.

16. The wireless communication method according to claim 15, wherein the RFID tag mounted on the fixing unit stores and manages information which comprises at least one selected from the group consisting of provider name, model name, the number of printed pages, the number of printed dots and the lamp-on time of the fixing unit.

17. The wireless communication method according to claim 15, wherein the RFID tag mounted on the developing unit stores and manages information which comprises at least one selected from the group consisting of provider name, model name, serial number, the number of pages printed up to the present, the number of printed dots, and the quantity of waste toner comprising the number of rotations of an Organic Photosensitive Conductor (OPC) unit.

18. The wireless communication method according to claim 14, wherein the RFID tags are detachably mounted on a feed side of a detachable developing unit and an OPC unit of the image-forming system, respectively.

19. The wireless communication method according to claim 18, wherein the RFID tag mounted on the feed unit stores and manages information which comprises at least one selected from the group consisting of provider name, model name, serial number, the number of pages printed up to the present, the number of printed dots, and the quantity of waste toner comprises the number of rotations of the OPC unit.

20. The wireless communication method according to claim 18, wherein the RFID tag mounted on the Organic Photosensitive Conductor (OPC) unit stores and manages information which comprises at least one selected from the group consisting of provider name, model name, serial number, the number of pages printed up to the present, the number of printed dots, and the quantity of waste toner comprising the number of rotations of the OPC unit.

* * * * *